United States Patent
Cerullo et al.

(10) Patent No.: US 7,172,378 B1
(45) Date of Patent: Feb. 6, 2007

(54) ADJUSTABLE STOPS FOR ROLLOFF TRUCK

(76) Inventors: Carl Cerullo, 60 Turnpike Rd., Townsend, MA (US) 01469; Michael Gould, 475 School St., Winchendon, MA (US) 01475

(*) Notice: Subject to any disclaimer, the term of this patent is extended or adjusted under 35 U.S.C. 154(b) by 0 days.

(21) Appl. No.: 11/161,967

(22) Filed: Aug. 24, 2005

(51) Int. Cl.
*B60P 1/64* (2006.01)

(52) U.S. Cl. ............................................. 410/80

(58) Field of Classification Search ............... 410/80, 410/77
See application file for complete search history.

(56) References Cited

U.S. PATENT DOCUMENTS

| | | | | |
|---|---|---|---|---|
| 2,623,759 A * | 12/1952 | Forbas | ............. | 410/30 |
| 3,002,636 A * | 10/1961 | Felburn | ............. | 414/800 |
| 3,438,671 A * | 4/1969 | Seng | ............. | 410/82 |
| 3,471,048 A * | 10/1969 | Terho | ............. | 410/73 |
| 3,521,845 A * | 7/1970 | Sweda et al. | ............. | 410/83 |
| 3,817,413 A * | 6/1974 | Ham | ............. | 414/498 |
| 3,857,504 A * | 12/1974 | Bausenbach et al. | ....... | 414/500 |
| 3,989,294 A * | 11/1976 | Carr | ............. | 410/82 |
| 4,013,017 A * | 3/1977 | Toyota et al. | ............. | 410/78 |
| 4,047,748 A * | 9/1977 | Whaley et al. | ............. | 410/82 |
| 4,456,414 A * | 6/1984 | Williams | ............. | 410/80 |
| 4,954,039 A | 9/1990 | Johnston | | |
| 5,183,371 A | 2/1993 | O'Daniel | | |
| 5,678,978 A | 10/1997 | Markham | | |
| 5,829,946 A * | 11/1998 | McNeilus et al. | ....... | 414/495 |
| 6,390,742 B1 * | 5/2002 | Breeden | ............. | 410/77 |
| 6,537,015 B2 * | 3/2003 | Lim et al. | ............. | 414/498 |
| 6,676,221 B2 | 1/2004 | O'Daniel | | |
| 6,896,457 B2 * | 5/2005 | Halliar | ............. | 410/77 |

* cited by examiner

*Primary Examiner*—H Gutman
(74) *Attorney, Agent, or Firm*—Mark P White

(57) ABSTRACT

A system for optimizing the load position for a container loaded onto a rolloff truck which has two side rails is effected by means of a number of pockets on each side rail. Removable stop assemblies are inserted into a corresponding pocket on each side rail. The container is then pulled up by means of a cable winch, until the container fits against the stops located on each rail. Sufficient tension is maintained on the cable so that the container cannot slide or otherwise move off the selected position, in which the load is equally distributed between the front and rear wheels.

16 Claims, 8 Drawing Sheets

ADJUSTABLE STOPS FOR ROLLOFF TRUCK

This invention generally relates to an improved system for adjusting the location of containers on rolloff trucks, and more specifically relates to a system of adjustable stops which facilitates the adjusting of the container.

DESCRIPTION OF THE PRIOR ART

The prior art discloses a number of vehicle types for loading, transporting, and unloading containers used, inter alia, for rubbish and refuse. The rolloff truck is one of the most popular of these vehicles. These vehicles are particularly well adapted for hauling refuse containers, which are typically steel boxes.

The containers are typically lifted from an adjacent site at which refuse is generated, such as a construction site, or a store or factory which generates a large quantity of refuse on a regular basis. The containers are then transported to a dump or recycling location. The empty containers are then recycled to active construction or other sites requiring the containers.

There are two primary configurations used to lift the container on and off the rolloff truck. The tilt frame rolloff truck is the most common of these. This tilt frame version has two fixed rails which can be raised and lowered by means of a hydraulic ram. The container is then pulled onto these rails by means of a cable winch. The cable is affixed to the container, typically by a hook. The container is pulled up the inclined rails until it is in proximity to a set of stops. The rails are then lowered, and the cable pulls the container along the lowered rails until it fully engages the stops. These stops are located in a position so that the weight of the container, together with the weight of the loading mechanism, will be in balance. The cable remains in a state of light tension, so that the container will not move back from the stops.

The issue of balance and weight distribution is critical to a proper design. If the container is too far back from the cab of the rolloff truck, there will be insufficient weight on the front wheels to allow for effective steering of the truck, and putting too much weight on the rear wheels, causing a safety hazard. Similarly, if the weight is too far forward, there will be too much weight on the front wheels, making them subject to blow-out, and causing a different, but equally dangerous, safety hazard.

The other type, known as the "hook-lift" has a boom located at the rear of the truck chassis, and which extends out to the rear of the chassis. The boom hooks onto the container and pulls it onto the bed of the truck by means of a hydraulic system. In this type of system the container must also be disposed at a point where the load on the truck is in balance, and must also be restrained so that it will not slide or otherwise move on the truck rails or bed on which it is disposed. Accordingly, a similar type of hydraulic cable winch is used, which typically pulls the container against stops disposed in proximity to the forward end of the container.

At present, rolloff equipment uses two different types of rails. Outside rails are presently the most widely used. However, inside rails continue to be used as well. The rails are the lifting platform on the truck chassis. The container rails, which are generally affixed to the bottom of the container to add structural strength, may rest on the rails of the rolloff truck. In the case where the rolloff truck has outside rails, the rails of the container ride on their cylindrical rollers on frame rails of the rolloff truck. In contrast, the container's rails ride inside of the rails of the truck when inside rolloff truck rails are used.

The problem which the current invention addresses is the difficulty of selecting the balance point of the container relative to the truck. The balance point will change based on the weight of the refuse, the amount of refuse, and the location of the refuse within the container. It has been found that the location of the stops provided by the manufacturer are not optimum for all kinds of loads and containers. The present invention provides a means to securely position containers at or near the optimum position for a wide variety of loads and containers.

SUMMARY OF THE INVENTION

It is the object of the present invention to provide a system which allows the user to load a container onto a rolloff truck in a position of optimum balance. It is a further object of the invention that the system must be effective for a wide range of containers and loads. It is a further object of the invention that the system be inexpensive, simple, and easy to operate.

In accordance with a first aspect of the invention an adjustable stop system for a rolloff truck having two frame rails includes affixing a number of pockets of substantially similar shape in each of the frame rails.

In accordance with a second aspect of the invention a number of removable stop assemblies are fabricated, each of which is insertable in each pocket on each frame rail.

In accordance with a third aspect of the invention one stop assembly is inserted into a pocket in each rail at positions equally spaced from the front of the truck.

In accordance with a fourth aspect of the invention means are provided for retaining a container against the stop assemblies.

In accordance with a fifth aspect of the invention a winch cable system is used to retain the container against the stop assemblies.

In accordance with a sixth aspect of the invention the stops are inserted in pockets so that the container is optimally disposed on the rolloff truck from the standpoint of weight distribution.

In accordance with a seventh aspect of the invention each pocket is in the form of a hollow parallelepiped.

In accordance with an eighth aspect of the invention each stop further includes a lower body that extends within a pocket and forward flange and rear flange that prevents the adjustable stop from falling through the pocket.

In accordance with a ninth aspect of the invention each stop contains a semi-circular cutout which mates with a roller affixed to the front of the container.

In accordance with a tenth aspect of the invention the pockets are affixed to the frame rail by welding.

In accordance with an eleventh aspect of the invention each pocket is affixed to the frame rail so that it does not extend either above or below the frame rail.

BRIEF DESCRIPTION OF THE DRAWINGS

These, and other aspects of the invention, may be understood with reference to the drawings provided herein, in which.

DESCRIPTION OF THE PREFERRED EMBODIMENTS

Figure 1:
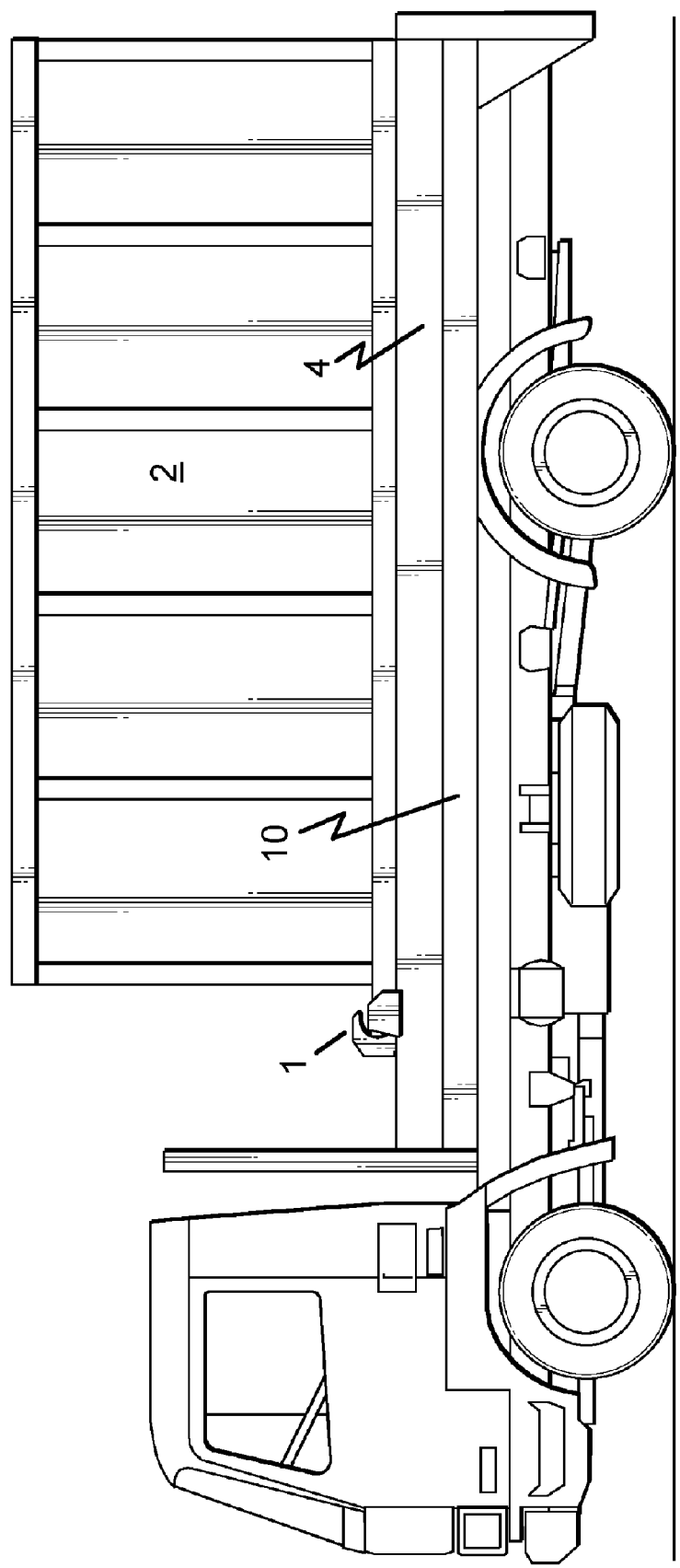
FIG. 1 depicts an elevation view of a prior art rolloff truck.
Figure 2:
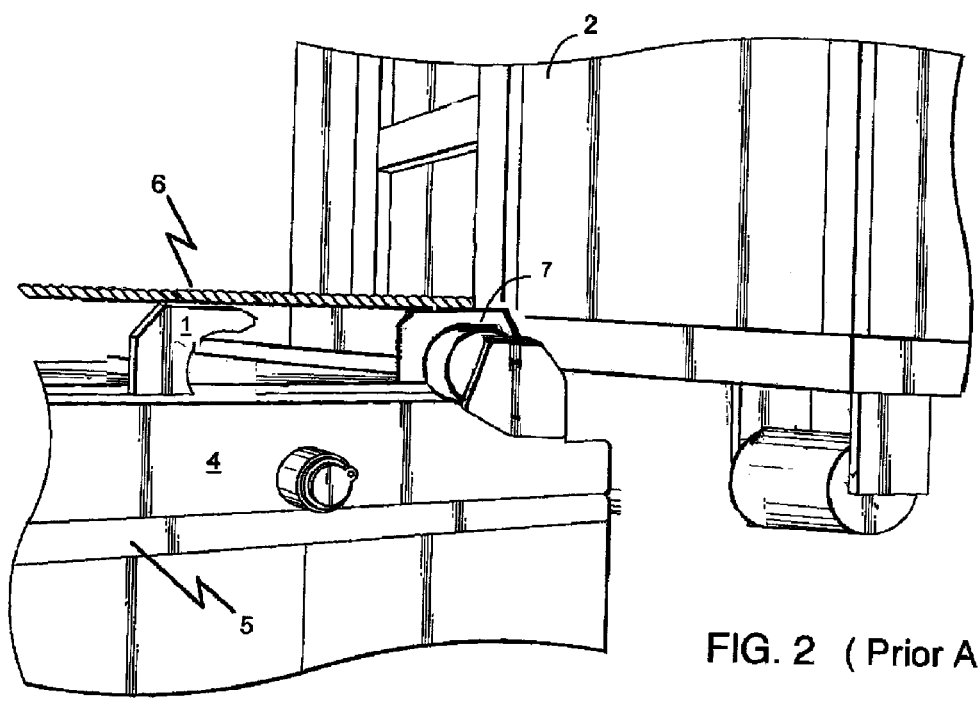
FIG. 2 depicts a detail elevation view of the rail of the prior art rolloff truck in proximity to the stop.
Figure 3:
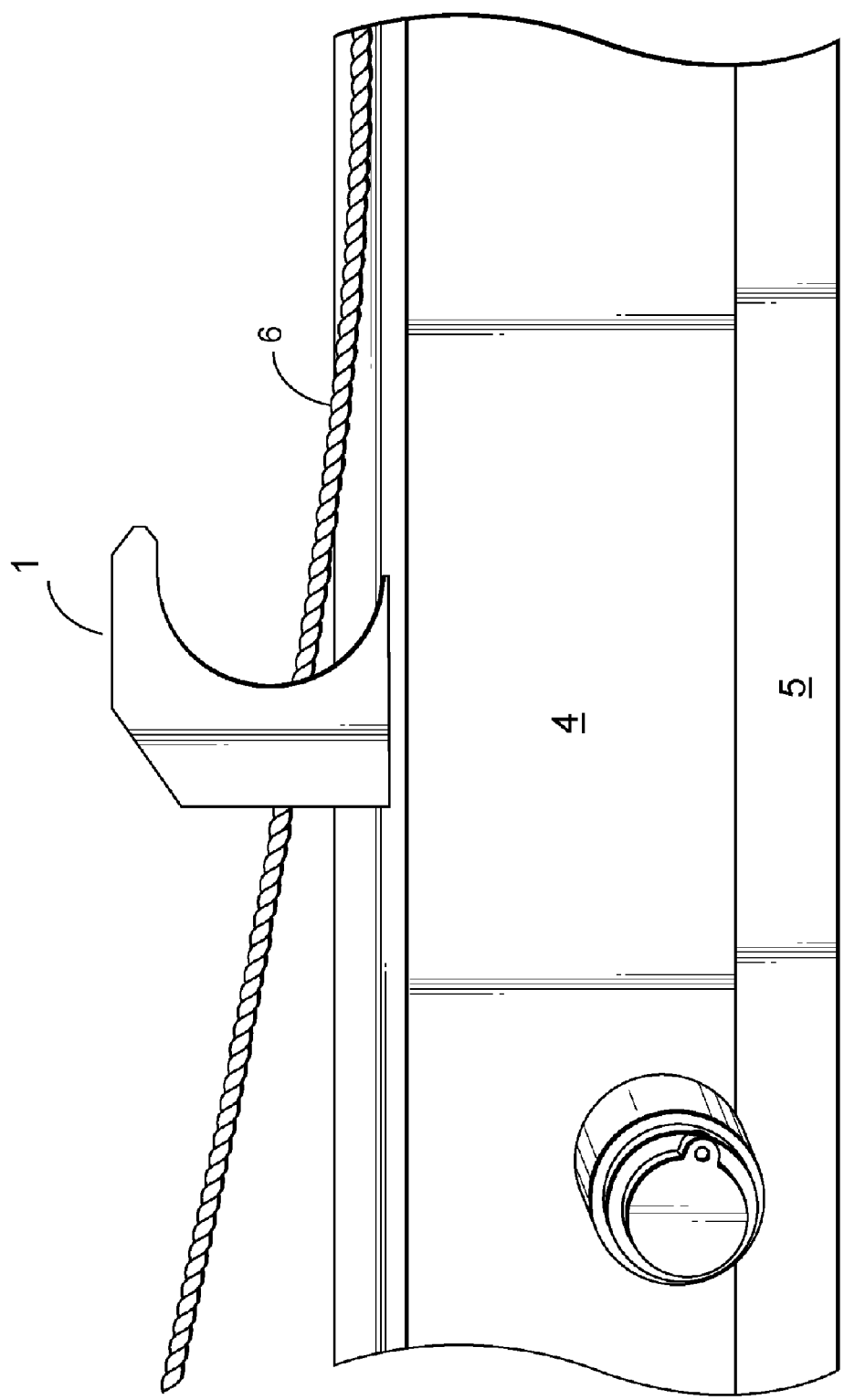
FIG. 3 depicts a further detail elevation view of the rail of the prior art rolloff truck in proximity to the stop.
Figure 4:
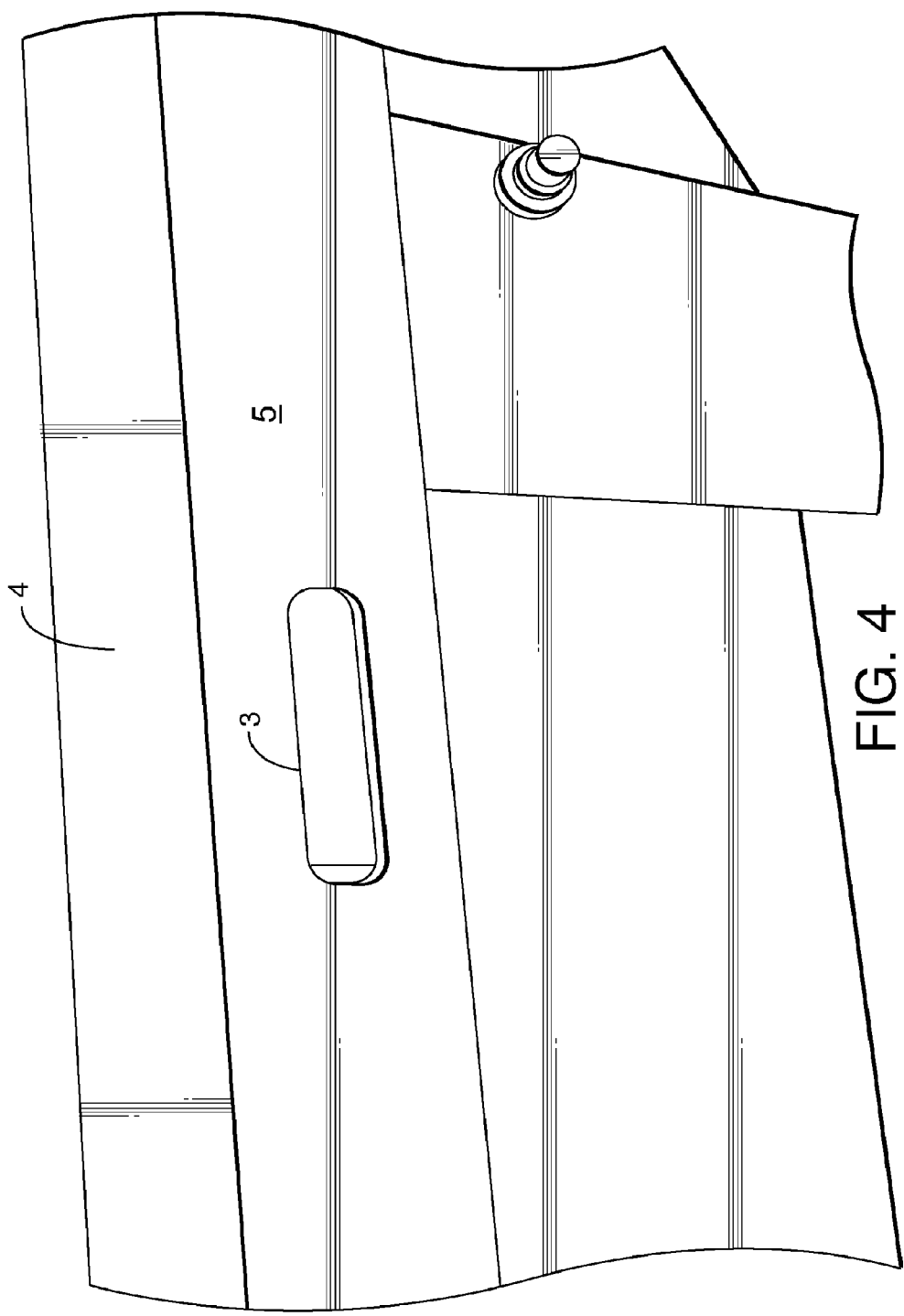
FIG. 4 depicts a bottom plan view of the rolloff truck rail, showing the stop pocket.

The present invention may be understood by first referring to FIGS. 1, 2, and 3, which depict a prior art rolloff truck. The truck has a set of rails 10 which form part of the structure of the truck. The frame rails 4 are independent of the truck rails, and tilt to allow the container to slide on and off of the truck. As shown in these figures a container 2 is loaded on the frame rails. As seen in FIG. 2 a cylindrical roller 7 is affixed to the container 2, and is used to facilitate the sliding of the container onto the frame rails. It also mates with the stop 1, which is seen to have a semi-circular aspect to facilitate the mating with the roller. The prior art stop 1 is seen in detail in FIG. 3 as well.

Figure 7:
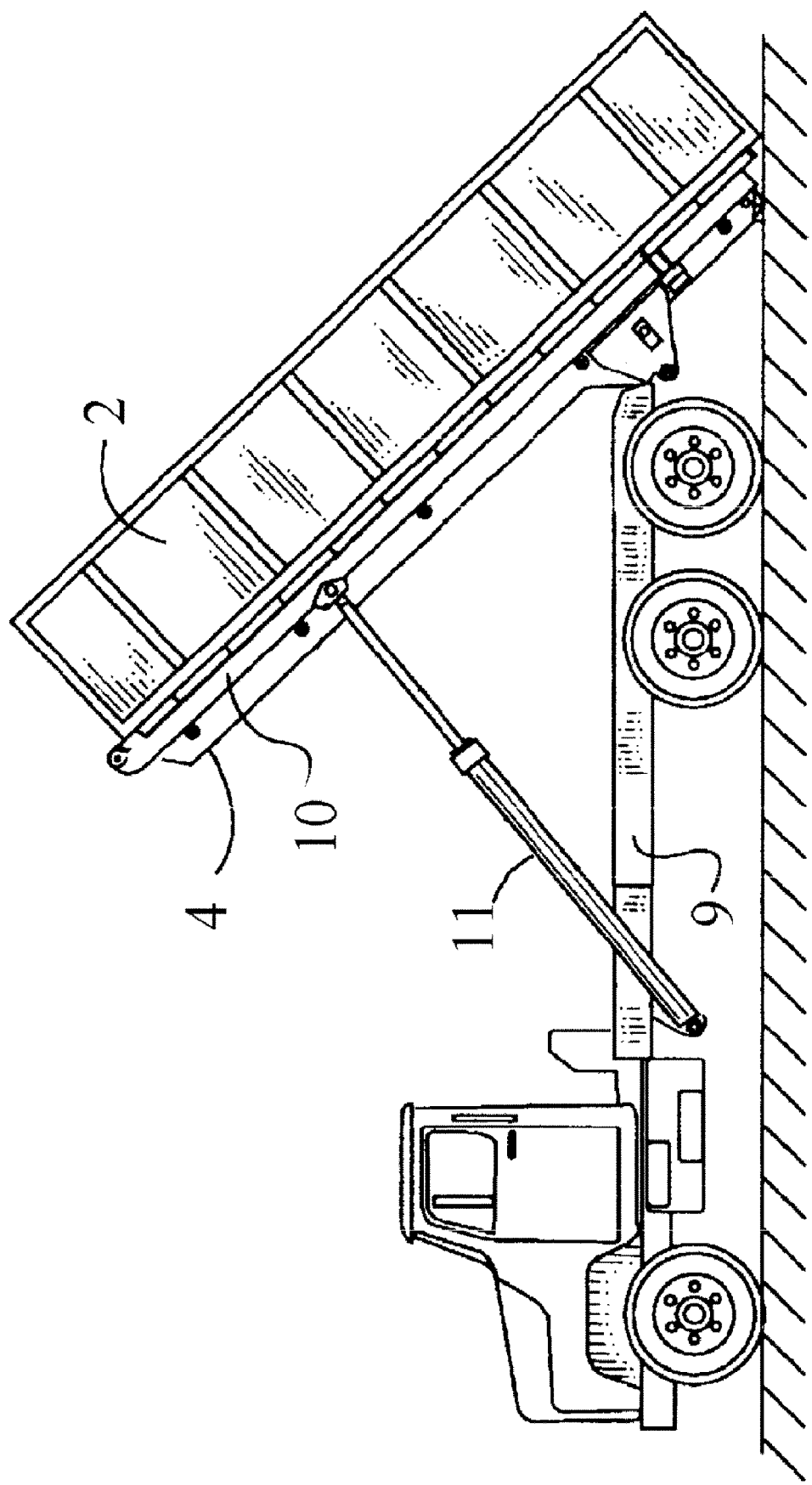
FIG. 7 depicts a prior art rolloff truck of the tilt frame type.

Referring now to FIG. 7 the operation of the prior art rolloff truck may be further understood. The frame rails are in tilt mode so that the container may be slid on or off the truck. In this drawing the container 2 is riding on the frame rails 4 of the rolloff truck, which in turn is elevated by means of hydraulic ram 11. The truck rails 9 are clearly seen in this figure, as are the container rails 10.

Referring again to FIG. 1, the container 2 is disposed rather far back on the truck. This position is a preferred one, providing that the container is lightly loaded. However, with a heavily loaded container it is desirable to move the container further forward on the truck. However, this cannot be done with prior art rolloff trucks because a single pair of stops are provided by the manufacturer that cannot be changed without cutting and welding, which is impractical every time a differently loaded container is transported.

Referring again to FIG. 2, the container is not yet pulled forward so that the cylindrical roller 7 will mate with the stop 1, by means of a cable winch that pulls the container 2 forward allowing the mating of the roller 7 with the stop 1.

The present invention solves the problem of positioning differently loaded containers by providing a means to modify the manufacturer's design with adjustable stops. The modification consists of first inserting a number of pockets in the hollow (typically) frame rails. Next, a set of removable stops are created, which fit snugly into the pockets in the frame rails. A stop is then inserted into corresponding pockets on each side at a distance calculated to best equalize the load of the container.

Figure 8A:
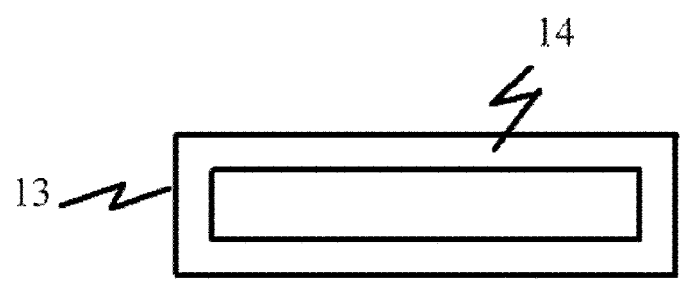
FIG. 8a depicts a top plan view of the stop pocket, which has the form of a hollow parallelepiped.
Figure 8B:
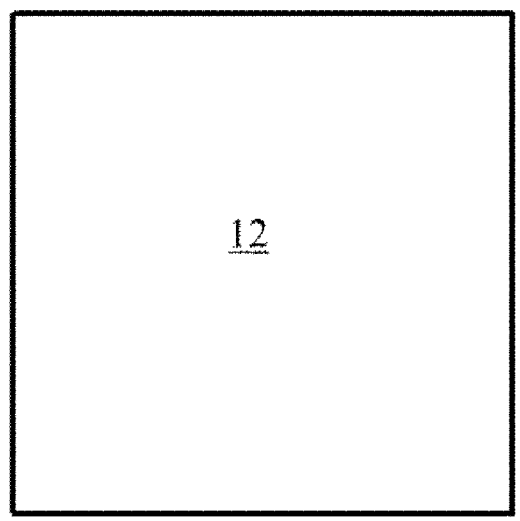
FIG. 8b depicts a side elevation view of the stop pocket, which has the form of a hollow parallelepiped.

FIGS. 8a and 8b depict a typical stop pocket 3. The pocket in the preferred embodiment is in the form of a hollow parallelepiped has an end 13 dimension of about 1¾", and a wall thickness 14 of about ⅜". The width of the pocket is about 4⅛", and it height is about 7½". These tolerances are maintained to plus or minus 1/16 ".

Figure 6:
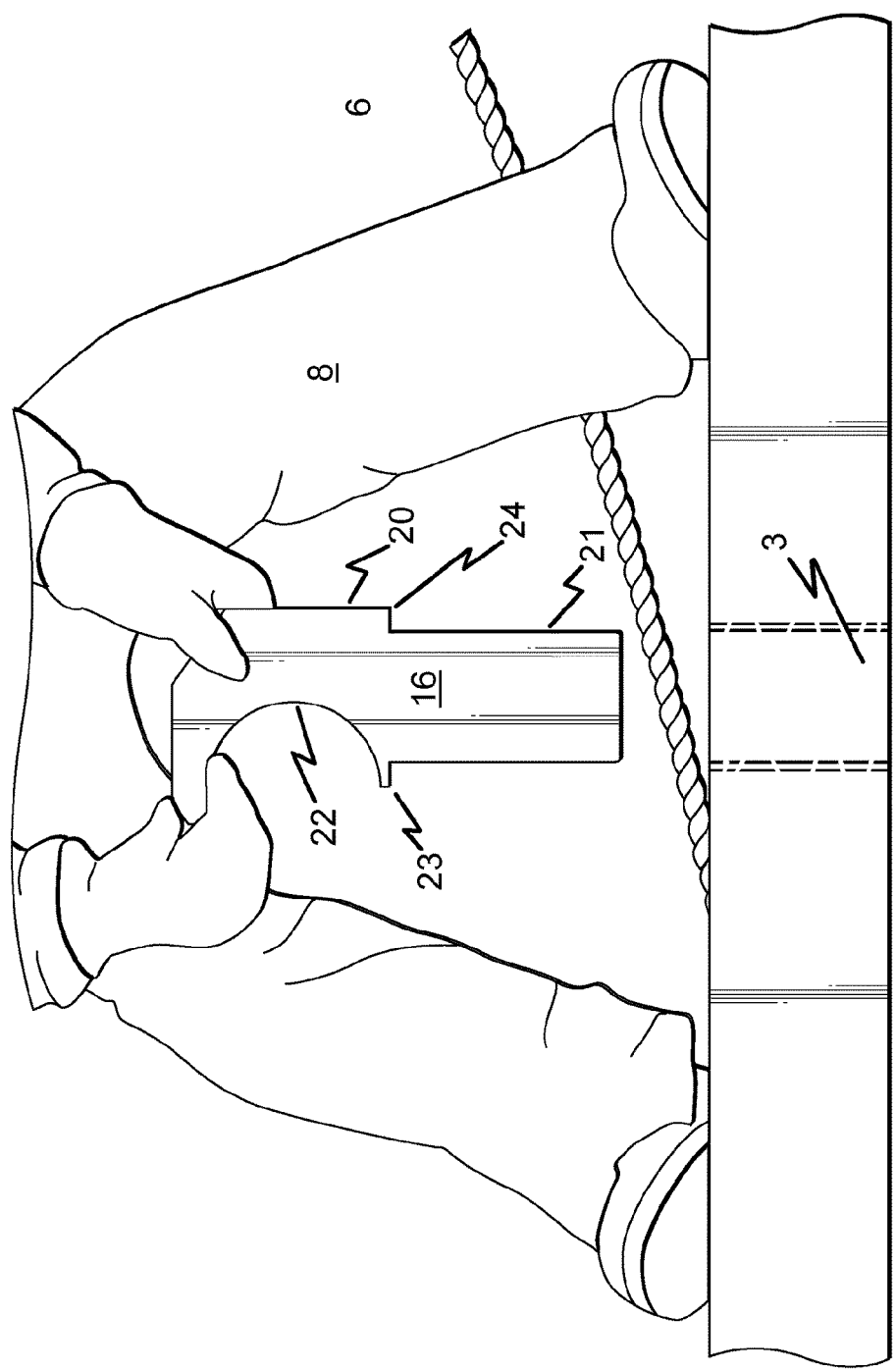
FIG. 6 depicts a user inserting a stop into a stop pocket.

The stop pocket is welded into the frame rail so that the top and bottom of the pocket are more or less flush with the rail frame, as shown in FIG. 6. A number of these pockets are welded into each side of the frame rail, so that there is a stop pocket on each side at the same distance from the front of the truck.

Referring now to FIG. 6 the details of the removable stop 16 may be seen. The stop is made from any number of steels and steel alloys in the preferred embodiment and has a thickness of about 1", which easily fits in the pocket with about ⅛" to spare. The lower body 21 of the removable stop 16 is about 3⅝" in width, compared to the pocket width of 3¾". Forward 23 and rear 24 flanges protrude about ¾" beyond the lower body 21, so that the stop 16 is restrained from falling through the stop pocket 3. The forward end of the top of the removable stop 16 has a semi-circular cutout 22 with a radius of about 3". This cutout conforms to the shape of the front roller 7 of the container.

To insert the removable stop it is simply dropped into place by the user 8, standing on the frame rail. To remove the removable stop 16 it is pulled up by the user standing in about the same position as seen in FIG. 6. Alternatively the user may insert and remove the removable stops while standing on the ground.

Once a removable stop has been inserted into each side of the frame rail at a corresponding distance from the front of the frame rail system the container may be pulled up onto the tilted frame rail system using the same cable winch arrangement as in the prior art. The cable is maintained in light pressure, as in the prior art, so that the container does not slip backwards on the frame rails.

Figure 5:
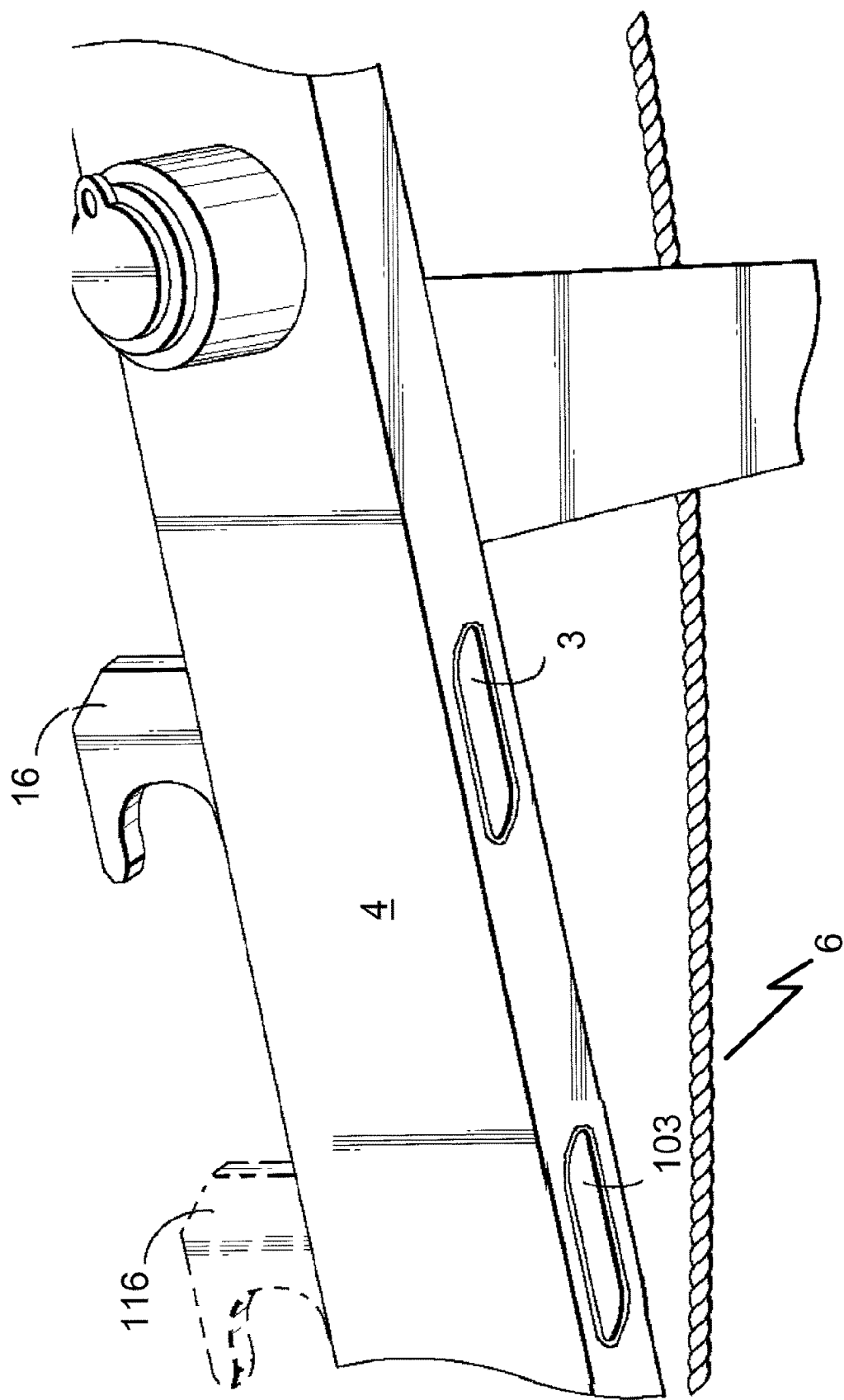
FIG. 5 depicts a perspective view of the rolloff truck rail, with a stop inserted in the pocket.

Referring now to FIG. 5, it is seen that the frame rail 4 has been modified by welding in two stop pockets. The removable stop 16 may be inserted in either pocket, since the two pockets have identical dimensions to within 1/16". Although only two pockets are shown in this figure, additional pockets may be affixed, at intervals similar to the interval shown in this figure, or at graduated intervals if desired. The frame rail opposite that shown in FIG. 5 will have pockets affixed which are mirror images of those shown in this figure.

While the invention has been described with reference to specific embodiments, it will be apparent that improvements and modifications may be made within the purview of the invention without departing from the scope of the invention defined in the appended claims.

What is claimed is:

1. An adjustable stop system for a rolloff truck, the rolloff truck comprising two frame rails, the system comprising:
   (a) a multiplicity of pockets, each in the form of a hollow parallelepiped, affixed in each of the frame rails;
   (b) a removable stop assembly insertable in the pocket on each frame rail;
   (c) means for retaining a container against the stop assemblies, so that the container may be disposed on the rolloff truck in one of a number of different positions.

2. The adjustable stop system of claim 1 wherein each stop further comprises:
   a. a lower body which extends within one of the pockets;
   b. a forward flange and a rear flange that prevent the adjustable stop from falling through the pocket;
   c. a semi-circular cutout formed above the forward flange, and which mates with a roller affixed to a front of the container.

3. The adjustable stop system of claim 2 wherein the pockets are affixed to the frame rail by welding.

4. The adjustable stop system of claim 3 wherein each pocket is affixed to the frame rail so that said pocket does not extend either above or below said frame rail.

5. The adjustable stop system of claim 1 wherein the pockets are affixed to the frame rail by welding.

6. The adjustable stop system of claim 5 wherein each pocket is affixed to the frame rail so that said pocket does not extend either above or below said frame rail.

7. The adjustable stop system of claim 1 wherein each pocket is affixed to the frame rail so that said pocket does not extend either above or below said frame rail.

8. An adjustable stop system for loading a container onto a rolloff truck which comprises a left and a right frame rail, each of the same length, spaced apart, and disposed longitudinally on the truck, the system comprising:
   a) a multiplicity of pockets affixed in pairs on the frame rails, one of each pair on the left rail and the other on the right rail, and each one of a pair located at about the same distance from a back end of the corresponding rail;
   b) a removable stop assembly insertable into each of the pockets;
   c) means for drawing the container longitudinally onto the rails and against a pair of the stop assemblies inserted into a pair of the stop pockets; and
   d) means for retaining the container against the stop assemblies,
   so that the container may be securely disposed on the rolloff truck rails at one of a number of different positions.

9. The adjustable stop system of claim 8 wherein each stop further comprises:
   (a) a lower body which extends within one of the pockets;
   (b) a forward flange and a rear flange that prevent the adjustable stop from falling through the pocket; and
   (c) a semi-circular cutout formed above the forward flange, and which mates with a roller affixed to a front of the container.

10. The adjustable stop system of claim 9 wherein the pockets are affixed to the frame rail by welding.

11. A method for loading a container onto a rolloff truck which comprises a left and a right frame rail, each of the same length, spaced apart, and disposed longitudinally on the truck, the method comprising:
   a) affixing multiplicity of pockets in pairs on the frame rails, one of each pair on the left rail and the other on the right rail, and each one of the pair located at about the same distance from a back end of the corresponding rail;
   b) inserting a pair of removable stop assemblies into one or more pairs of pockets;
   c) drawing the container longitudinally onto the rails and against the pair of the stop assemblies; and
   d) leaving the container drawn against the stop assemblies while transporting the container,
   so that the container is securely disposed on the rolloff truck rails at one of a number of different positions.

12. The method of claim 11 wherein each stop further comprises:
   (a) a lower body which extends within one of the pockets;
   (b) a forward flange and a rear flange that prevent the adjustable stop from falling through the pocket; and
   (c) a semi-circular cutout formed above the forward flange, and which mates with a roller affixed to a front of the container.

13. The method of claim 12, further comprising affixing the pockets to the frame rail by welding.

14. An adjustable stop system for loading a container onto a rolloff truck which comprises a left and a right frame rail, each of the same length, spaced apart, and disposed longitudinally on the truck, the system comprising:
   e) a multiplicity of pockets inserted in pairs into the frame rails, one of each pair on the left rail and the other on the right rail, and each one of a pair located at about the same distance from a back end of the corresponding rail;
   f) a removable stop assembly insertable into each of the pockets;
   g) means for drawing the container longitudinally onto the rails and against a pair of the stop assemblies inserted into a pair of the stop pockets; and
   h) means for retaining the container against the stop assemblies,
   so that the container may be disposed on the rolloff truck rails at one of a number of different positions.

15. The adjustable stop system of claim 14 wherein each stop further comprises:
   (a) a lower body which extends within one of the pockets;
   (b) a forward flange and a rear flange that prevent the adjustable stop from falling through the pocket; and
   (c) a semi-circular cutout formed above the forward flange, and which mates with a roller affixed to a front of the container.

16. The adjustable stop system of claim 15 wherein the pockets are affixed to the frame rail by welding.

* * * * *